US010055028B2

United States Patent
Toff

(10) Patent No.: US 10,055,028 B2
(45) Date of Patent: Aug. 21, 2018

(54) END OF SESSION DETECTION IN AN AUGMENTED AND/OR VIRTUAL REALITY ENVIRONMENT

(71) Applicant: GOOGLE INC., Mountain View, CA (US)

(72) Inventor: Jason Toff, Hoboken, NJ (US)

(73) Assignee: GOOGLE LLC, Mountain View, CA (US)

( * ) Notice: Subject to any disclaimer, the term of this patent is extended or adjusted under 35 U.S.C. 154(b) by 79 days.

(21) Appl. No.: 15/369,478

(22) Filed: Dec. 5, 2016

(65) Prior Publication Data

US 2018/0157344 A1  Jun. 7, 2018

(51) Int. Cl.
G06F 3/00 (2006.01)
G06F 3/0346 (2013.01)
G06T 19/00 (2011.01)
G06F 3/01 (2006.01)

(52) U.S. Cl.
CPC ............ *G06F 3/0346* (2013.01); *G06F 3/011* (2013.01); *G06F 3/012* (2013.01); *G06F 3/013* (2013.01); *G06T 19/006* (2013.01)

(58) Field of Classification Search
CPC ........ G06F 3/0346; G06F 3/012; G06F 3/011; G06F 3/013; G06T 19/006
See application file for complete search history.

(56) References Cited

U.S. PATENT DOCUMENTS

| 2012/0235902 | A1 | 9/2012 | Eisenhardt et al. |
| 2014/0375680 | A1 | 12/2014 | Ackerman et al. |
| 2015/0091780 | A1 | 4/2015 | Lyren |
| 2016/0180595 | A1 | 6/2016 | Grossinger et al. |
| 2016/0187969 | A1 | 6/2016 | Larsen et al. |
| 2016/0203642 | A1 | 7/2016 | Thomas |
| 2016/0313790 | A1 | 10/2016 | Clement et al. |
| 2017/0220119 | A1* | 8/2017 | Potts ................... G06F 3/016 |
| 2017/0345219 | A1* | 11/2017 | Holz ................... G09G 5/18 |
| 2017/0365101 | A1* | 12/2017 | Samec ................ G02B 27/017 |
| 2018/0095541 | A1* | 4/2018 | Gribetz ............... G06F 3/04842 |

OTHER PUBLICATIONS

International Search Report and Written Opinion from PCT Application No. PCT/US2017/048957, dated Jan. 10, 2018, 8 Pages.

* cited by examiner

*Primary Examiner* — Muhammad N Edun
(74) *Attorney, Agent, or Firm* — Brake Hughes Bellermann LLP

(57) ABSTRACT

In an augmented reality and/or a virtual reality system, termination of a virtual session, and/or suspension of a virtual session, may be detected based on detection of a position and/or orientation of a head mounted display device, and/or movement and position/orientation of the head mounted display device worn by the user. Follow on processing, and/or supplemental tasking, associated with the recently terminated virtual session, may be automatically initiated in response to the detection of the termination and/or suspension of the virtual session, without user intervention and/or manual input of a command instructing the system to initiate processing.

20 Claims, 19 Drawing Sheets

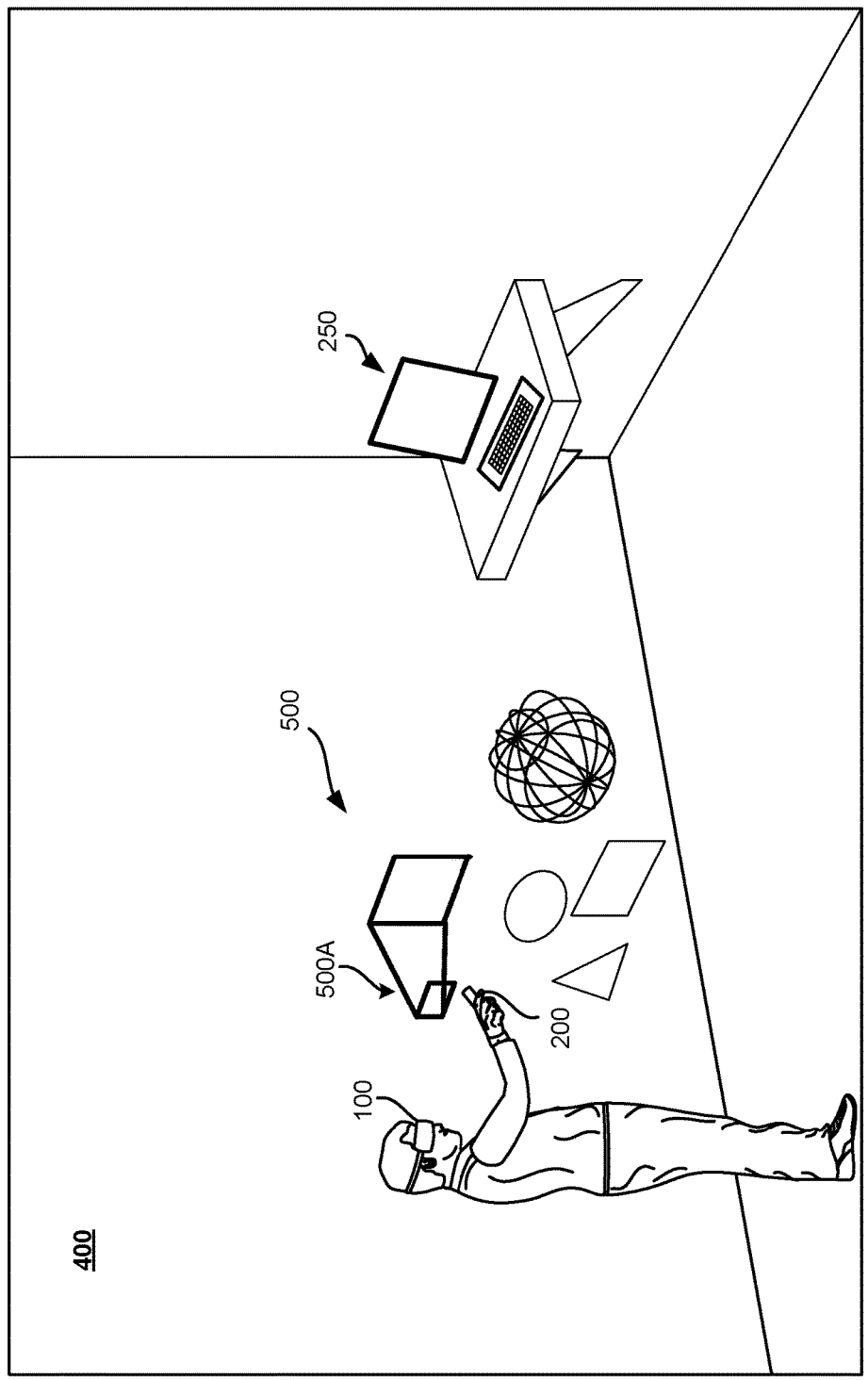

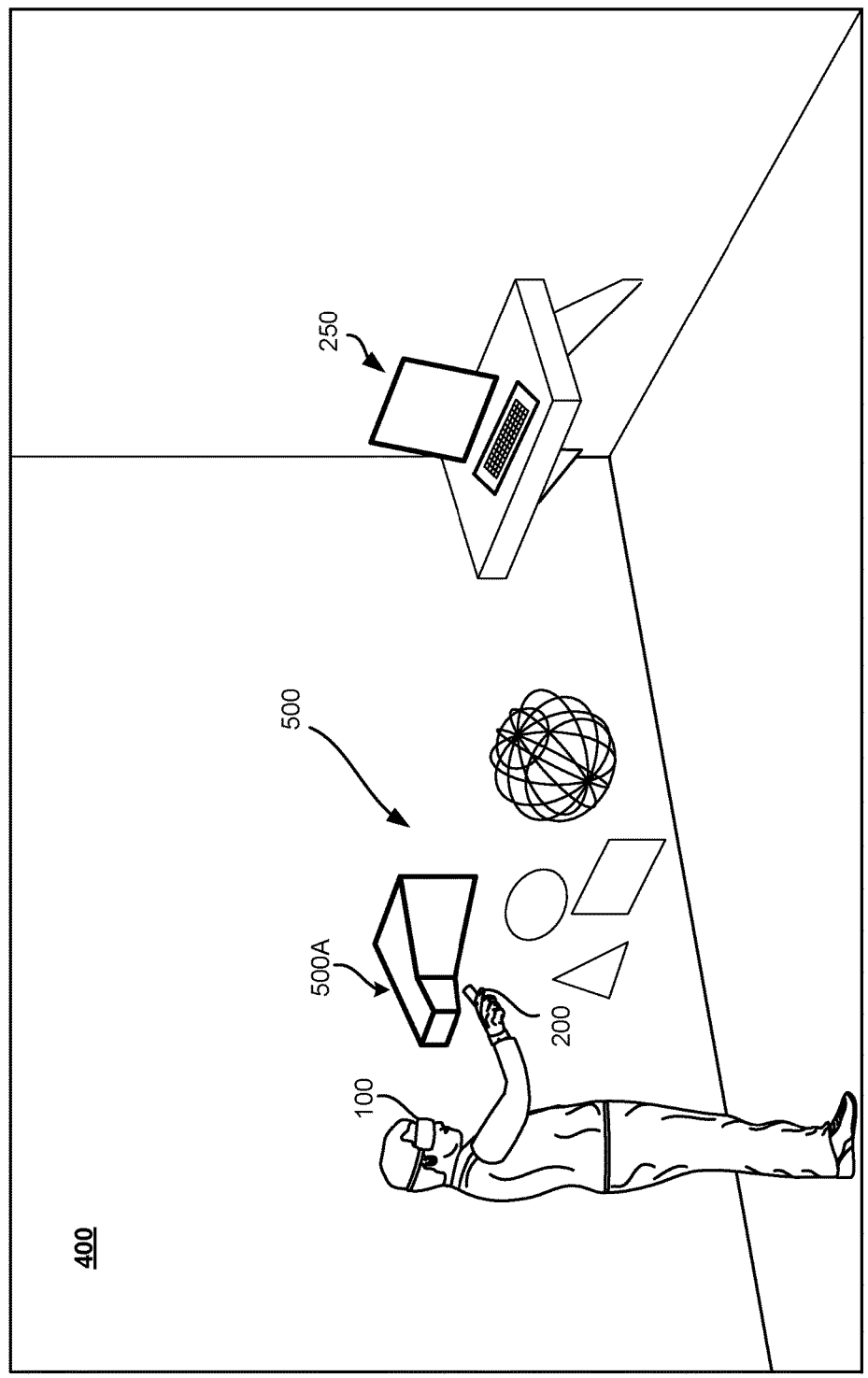

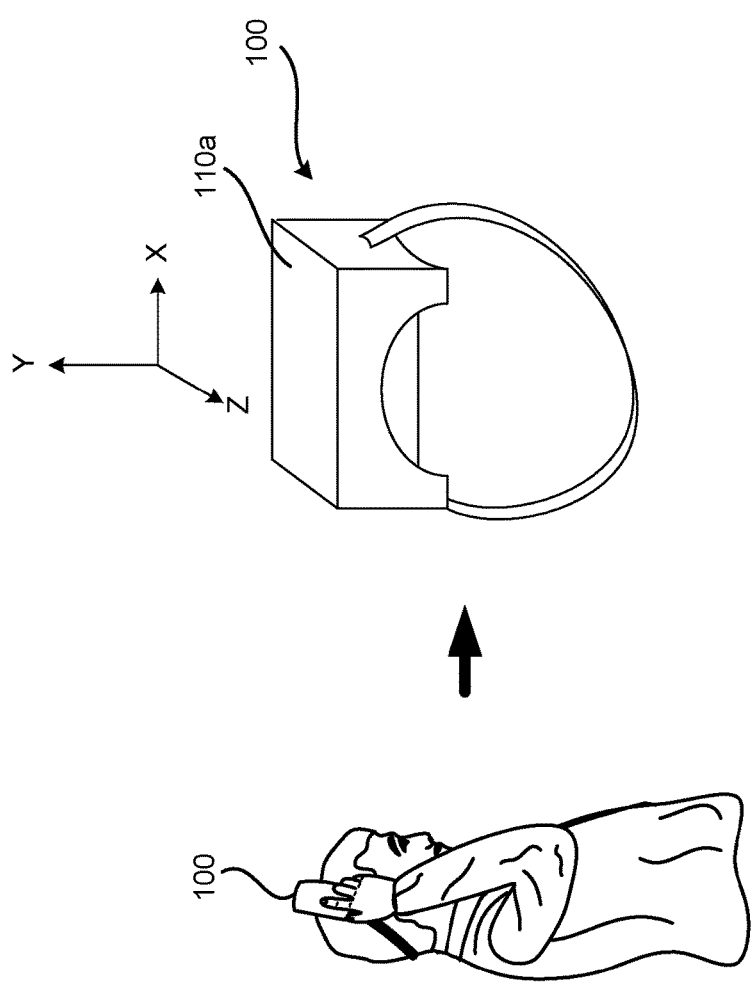

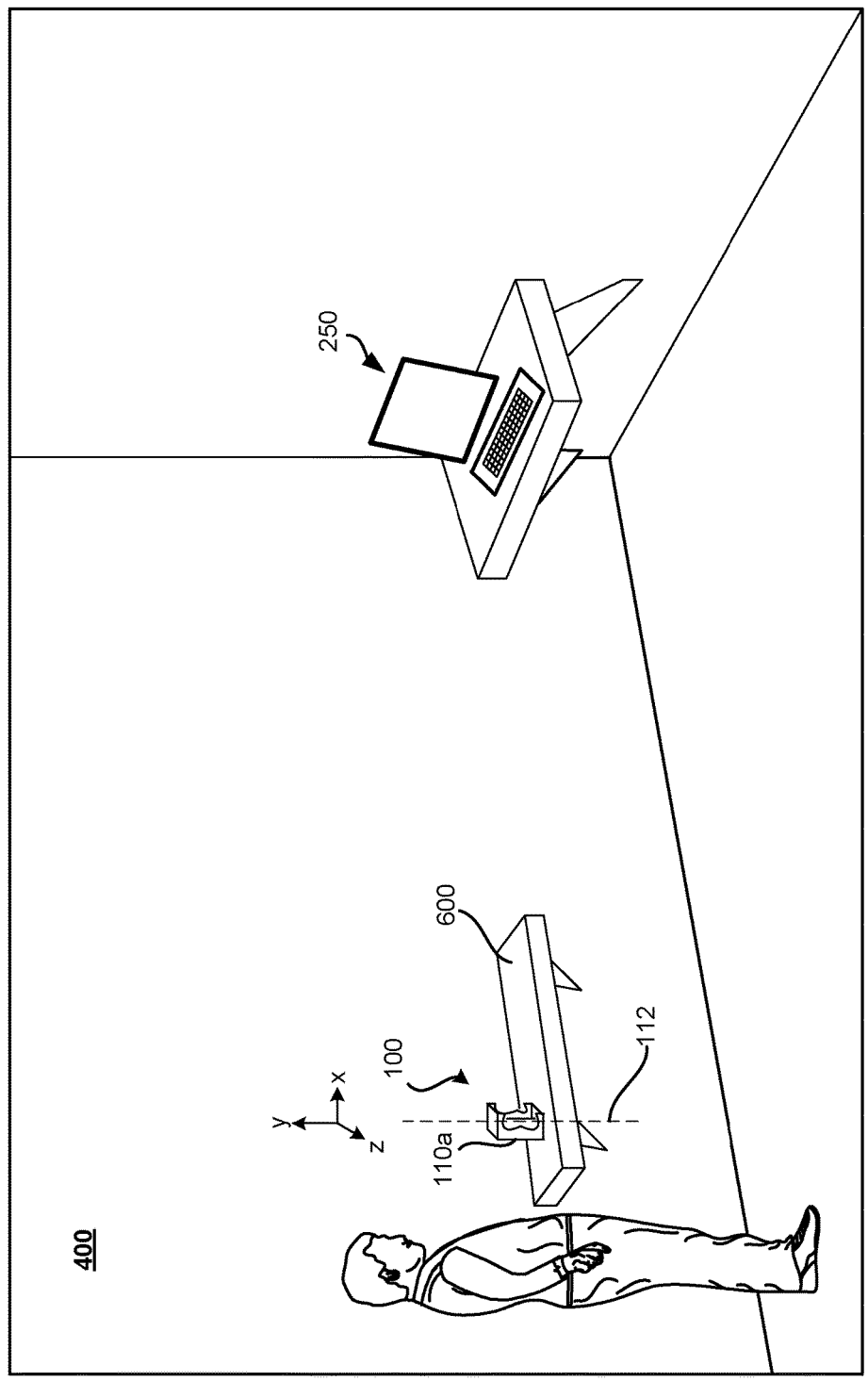

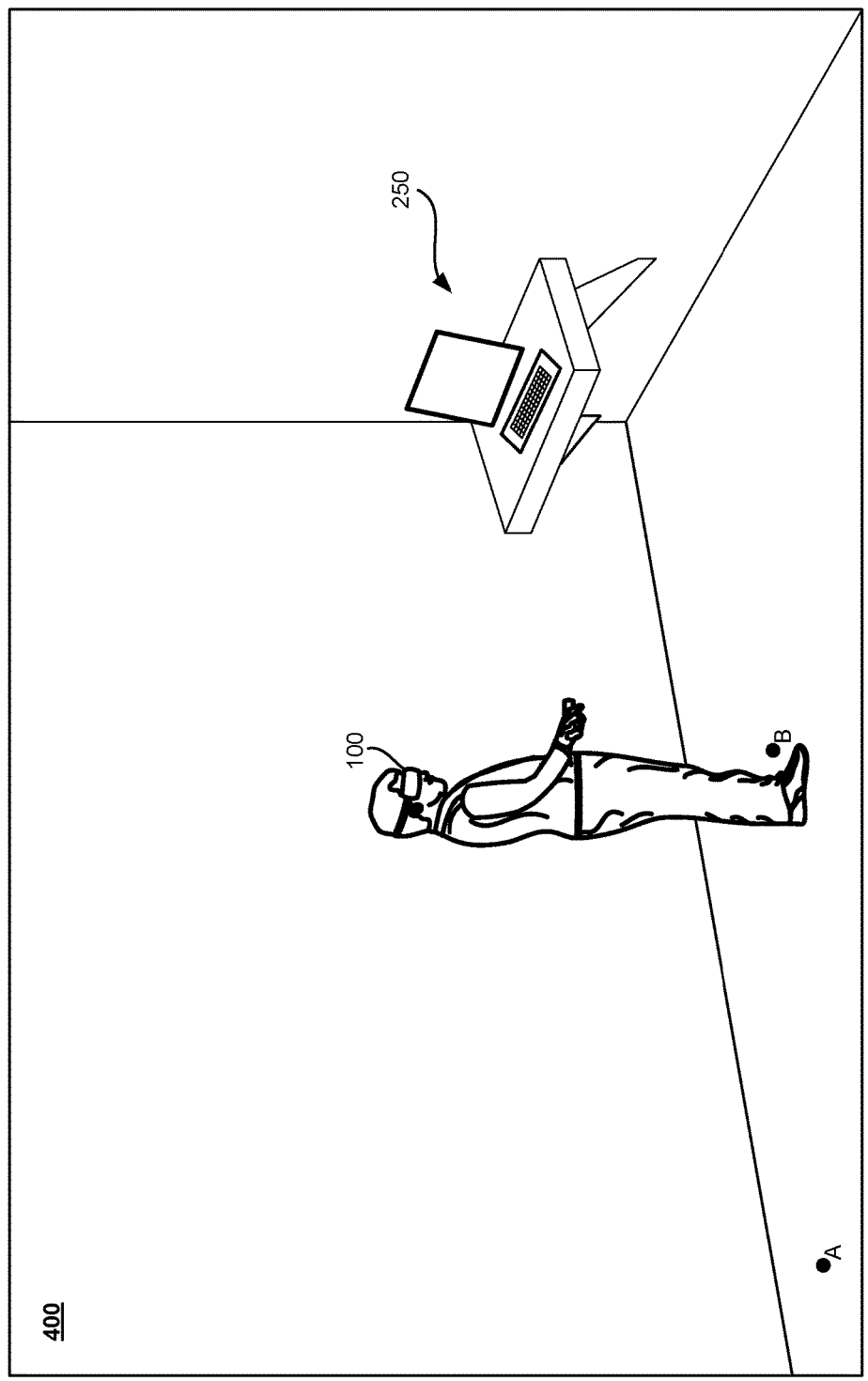

END OF SESSION DETECTION IN AN AUGMENTED AND/OR VIRTUAL REALITY ENVIRONMENT

FIELD

This document relates, generally, to detecting an end of an augmented and/or virtual reality session in an augmented reality and/or a virtual reality environment.

BACKGROUND

An augmented reality (AR) and/or virtual reality (VR) system may generate an immersive, three-dimensional (3D) virtual environment. A user may interact with virtual objects, elements, features and the like in this virtual environment using various electronic devices, such as, for example, a helmet or other head mounted device including a display, glasses or goggles that a user looks through when viewing a display device, one or more handheld electronic devices such as controllers, joysticks and the like, gloves fitted with sensors, keyboards, mouse, and other electronic devices.

SUMMARY

In one aspect, a method may include generating a virtual environment in a head mounted display (HMD) device operating in an ambient environment, initiating a virtual session and receiving at least one user input for executing at least one corresponding command in the virtual environment while the virtual session is in an active state, detecting and tracking at least one of a position or an orientation of the HMD in the ambient environment, detecting a gesture input based on the at least one of the position or the orientation of the HMD, detecting an end of the virtual session based on the detection of the gesture input, and initiating processing related to the at least one user input received during the virtual session while in the active state in response to the detected end of the virtual session.

In another aspect, a system may include a computing device configured to generate a virtual reality environment. The computing device may include a memory storing executable instructions, and a processor configured to execute the instructions. Execution of the instructions may cause the computing device to generate a virtual environment in a head mounted display (HMD) device operating in an ambient environment, initiate a virtual session and receiving at least one user input for executing at least one corresponding command in the virtual environment while the virtual session is in an active state, detect and track at least one of a position or an orientation of the HMD in the ambient environment, detect a gesture input based on the at least one of the position or the orientation of the HMD, detect an end of the virtual session based on the detection of the gesture input, and initiate processing related to the at least one user input received during the virtual session while in the active state in response to the detected end of the virtual session.

In another aspect, a computer program product embodied on a non-transitory computer readable medium may have stored thereon a sequence of instructions. When executed by a processor, the instructions may cause the processor to execute a method. The method may include generating a virtual environment in a head mounted display (HMD) device operating in an ambient environment, initiating a virtual session and receiving at least one user input for executing at least one corresponding command in the virtual environment while the virtual session is in an active state, detecting and tracking a position and an orientation of the HMD in the ambient environment, detecting a gesture input based on the at least one of the position or the orientation of the HMD, detecting an end of the virtual session based on the detection of the gesture input, and automatically initiating, in response to the detected end of the virtual session, processing related to the at least one user input received during the virtual session while in the active state, at a computing device in the ambient environment, the computing device being operably coupled to the HMD and external to the HMD.

The details of one or more implementations are set forth in the accompanying drawings and the description below. Other features will be apparent from the description and drawings, and from the claims.

BRIEF DESCRIPTION OF THE DRAWINGS

FIGS. 4A-4F illustrate a system for detecting an end of a virtual session, in accordance with implementations as described herein.

FIGS. 6A-6C illustrate a system for detecting an end of a virtual session, in accordance with implementations as described herein.

FIGS. 7A-7C illustrate a system for detecting an end of a virtual session, in accordance with implementations as described herein.

DETAILED DESCRIPTION

A user immersed in an augmented and/or a virtual reality environment wearing, for example, a head mounted display (HMD) device may explore the virtual environment and interact with the virtual environment through various different types of inputs. These inputs may include, for example, manipulation of the HMD and/or one or more external electronic device(s) operably coupled with the HMD, and/or hand/arm gestures, eye/head gaze, and the like. The ability to detect that a user has chosen to end an augmented/virtual reality session, and/or has reached an interim stopping point in the augmented/virtual reality session, without specific user intervention, and proceed with peripheral tasking and/or processing related to the user's activity in the augmented/virtual reality session, may enhance the user's experience and improve productivity.

In a system and method, in accordance with implementations described herein, further action, such as, for example, supplemental tasking, may be automatically performed by the system upon detection that the user has completed engagement in a virtual reality session, or temporarily suspended engagement in the virtual reality session. This detection may be made based on, for example, an action or gesture characteristically performed at the end of a virtual session, without a specific additional user input or intervention required to initiate the supplemental tasking. This action or gesture may include, for example, a removal of the HMD by the user, detected based on data provided by sensors in the HMD and/or other sensors in other components in the system. This further action, or supplemental tasking, may include tasks related to actions implemented by the user while engaged in the virtual environment, such as, for example, processing, compiling, generating previews, generating suggestions for subsequent action to be taken, and/or the like. The completion of the virtual session, and/or the temporary suspension of the virtual session, may be detected by the system in a passive manner, without specific user input or intervention indicating termination and/or suspension of the virtual session. The ability to automatically carry out peripheral tasks associated with the user's actions in the virtual environment in response to detection of an end of a virtual session, or a break at an intermediate point in the virtual session, may enhance the user's overall experience in the virtual environment and in completing related tasks in the real world environment. This may enhance user productivity, as the further action may be performed substantially automatically by the system, making productive use of a period of time (between the detected end of the virtual session and the time at which a user input to initiate the further action) which would otherwise remain unutilized.

Figure 1:
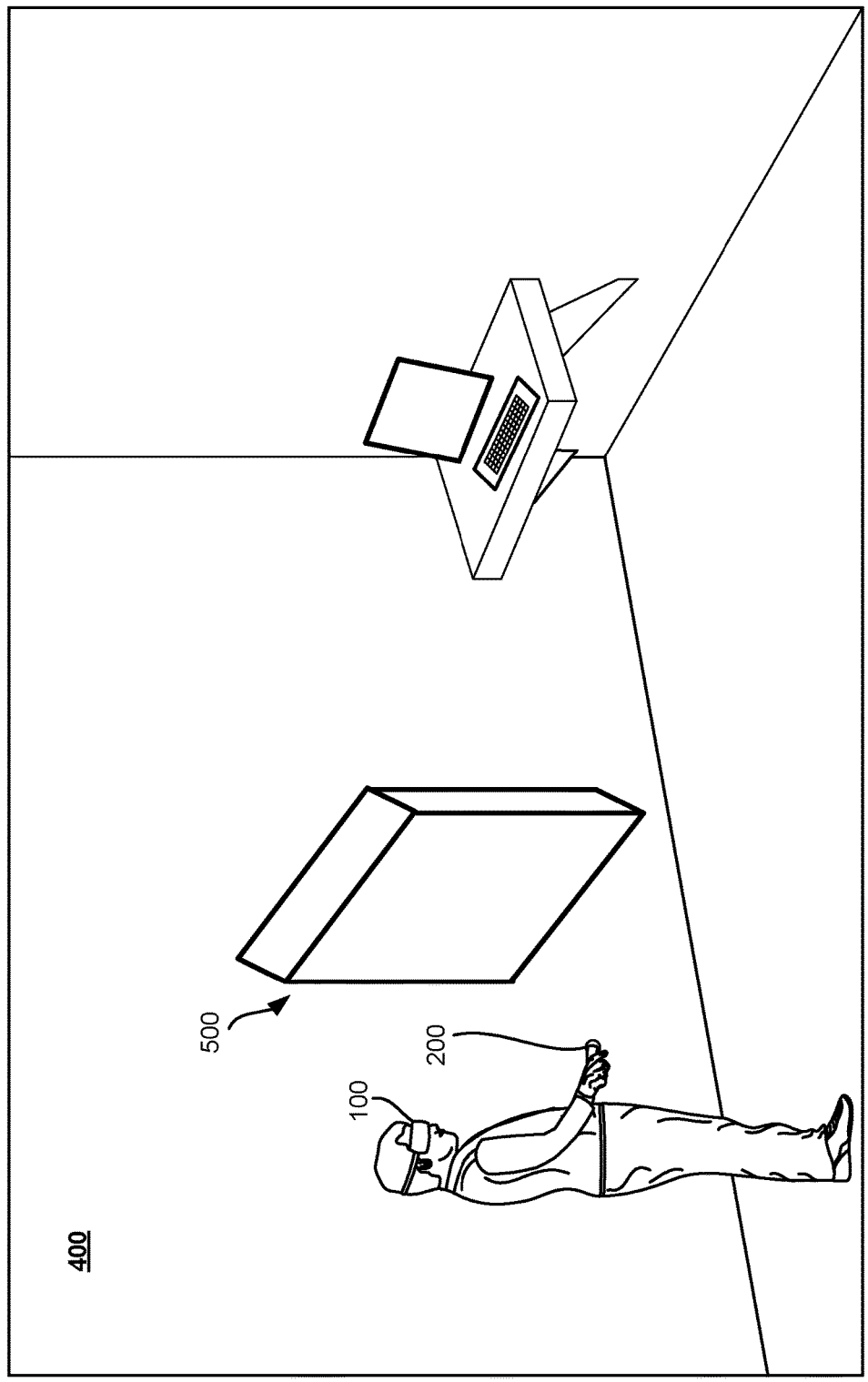
FIG. 1 is an example implementation of an augmented and/or virtual reality system including a head mounted display in communication with external input devices, in accordance with implementations as described herein.

FIG. 1 is a third person view of a user wearing an HMD 100. In this example third person view, the user is in a physical space 400, in which the augmented/virtual reality system is operable, and is engaged in a virtual environment, displayed on a display of the HMD 100. While the virtual environment is visible to the user within the HMD 100, an example representation 500 of the virtual environment (or an object therein) displayed to the user on the display of the HMD 100 is shown in FIG. 1, simply for ease of discussion and illustration. The user may interact with one or more external computing devices 200 that may be operably coupled with, and communicate with, the HMD 100. This may provide for communication between and the exchange of data between the external device(s) 200 and the HMD 100. In the example shown in FIG. 1, the external device 200 operably coupled with the HMD 100 is a handheld electronic device 200, or handheld controller 200. In some implementations, multiple handheld electronic devices 200, other external devices 200, such as, for example, a mouse, a keyboard, a joystick and the like, may be operably coupled to the HMD 100 to receive user input for interaction in the virtual environment. In this implementation, a task may be automatically performed by the system upon detecting that the user has completed engagement in a virtual reality session, or temporarily suspended engagement in the virtual reality session via the HMD 100.

Figure 2A:
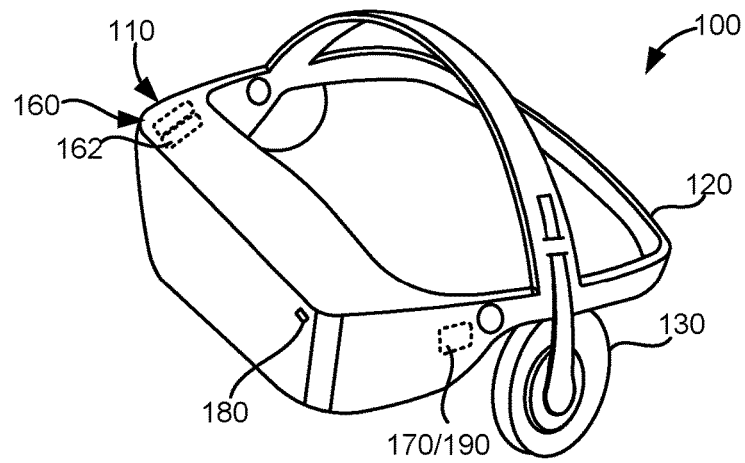
FIGS. 2A and 2B are perspective views of an example head mounted display device, in accordance with implementations as described herein.
Figure 2B:
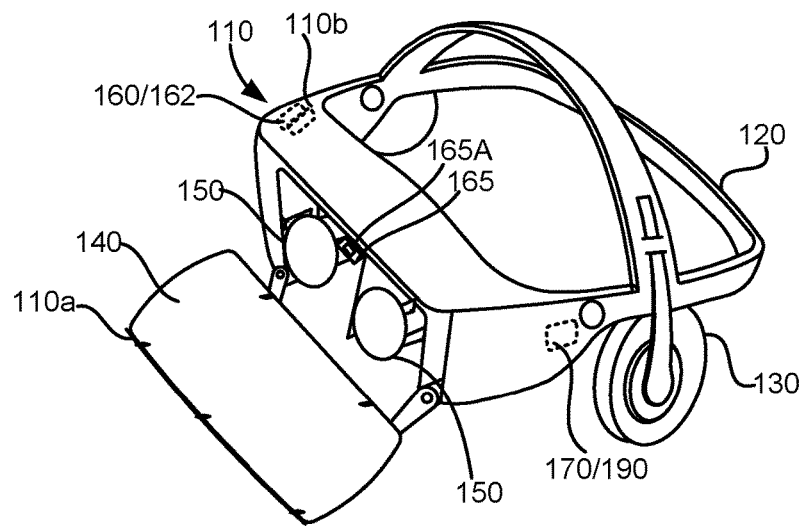

FIGS. 2A and 2B are perspective views of an example HMD, such as, for example, the HMD 100 worn by the user in the example shown in FIG. 1. The HMD 100 may include a housing 110 coupled to a frame 120, with an audio output device 130 including, for example, speakers mounted in headphones, also coupled to the frame 120. In FIG. 2B, a front portion 110a of the housing 110 is rotated away from a base portion 110b of the housing 110 so that some of the components received in the housing 110 are visible. A display 140 may be mounted on an interior facing side of the front portion 110a of the housing 110. Lenses 150 may be mounted in the housing 110, between the user's eyes and the display 140 when the front portion 110a is in the closed position against the base portion 110b of the housing 110. The HMD 100 may include a sensing system 160 including various sensors and a control system 170 including a processor 190 and various control system devices to facilitate operation of the HMD 100.

For example, in some implementations, the sensing system 160 may include an inertial measurement unit (IMU) 162 including various different types of sensors such as, for example, an accelerometer, a gyroscope, a magnetometer, and other such sensors. A position and orientation of the HMD 100 may be detected and tracked based on data provided by the sensors included in the IMU 162. The detected position and orientation of the HMD 100 may allow the system to in turn, detect and track the user's head gaze direction and movement.

In some implementations, the HMD 100 may include a gaze tracking device 165 including, for example, one or more sensors 165A, to detect and track eye gaze direction and movement. Images captured by the sensor(s) 165A may be processed to detect and track direction and movement of the user's eye gaze, and the detected and tracked eye gaze may be processed as a user input to be translated into a corresponding interaction in the immersive virtual experience. A camera 180 may capture still and/or moving images that may be used to help track a physical position of the user and/or other external devices in communication with/operably coupled with the HMD 100. The captured images may also be displayed to the user on the display 140 in a pass through mode.

Figure 3:
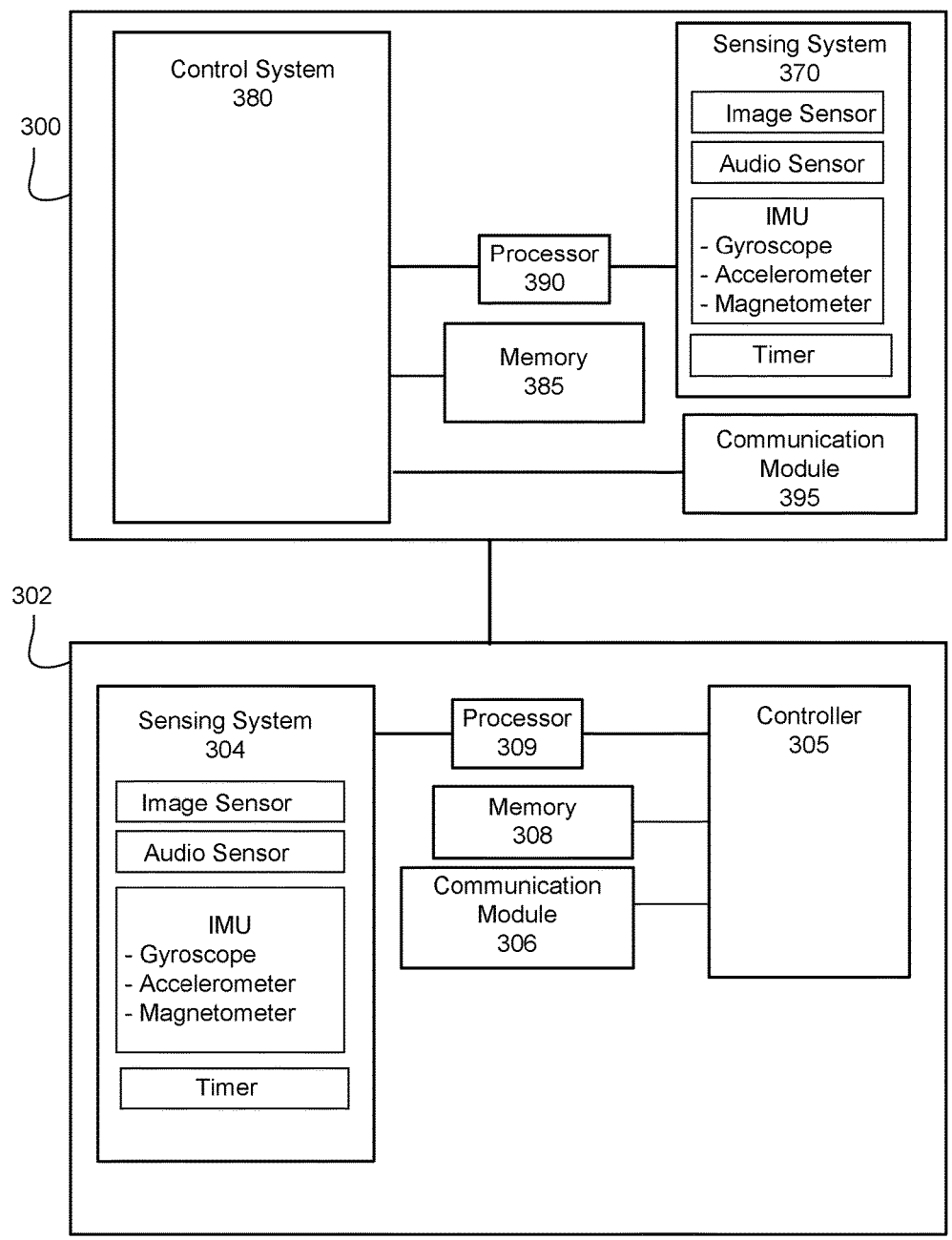
FIG. 3 is a block diagram of an augmented and/or virtual reality system, in accordance with implementations as described herein.

A block diagram of a system, in accordance with implementations described herein, is shown in FIG. 3. The system may include a first electronic device 300 (such as, for example, an HMD as described above with respect to FIGS. 1 and 2A-2B), and at least one second electronic device 302 (such as, for example, a handheld electronic device as described above with respect to FIG. 1, or other external device) in communication with the first electronic device 300.

The first electronic device 300 may include a sensing system 360 and a control system 370, which may be similar to the sensing system 160 and the control system 170, respectively, shown in FIGS. 2A and 2B. The sensing system 360 may include different types of sensors, including, for example, a light sensor, an audio sensor, an image sensor, a distance and/or proximity sensor, an IMU including, for example, a gyroscope, an accelerometer, a magnetometer and the like, a timer, and/or other sensors and/or different combination(s) of sensors. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a memory 380, and a processor 390 in communication with the sensing system 360 and the control system 370. The processor 390 may process inputs received from the sensing system 360, as well as from other external sources such as, for example, the second electronic device 302, and execute instructions corresponding to the detected inputs. The first electronic device 300 may also include a communication module 350 providing for communication between the first electronic device 300 and other, external computing devices, such as, for example, the second electronic device 302 and other computing devices involved in handling system related information.

The second electronic device 302 may include a communication module 306 providing for communication and data exchange between the second electronic device 302 and another device, such as, for example, the first electronic device 300. In some implementations, depending on a particular configuration of the second electronic device 302 (i.e., a handheld electronic device or controller, versus a keyboard or a mouse), the second electronic device 302 may include a sensing system 304 including, for example, an image sensor and an audio sensor, such as is included in, for example, a camera and microphone, an IMU, a timer, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, users may engage in applications in the virtual environment for which supplemental, or follow on, actions or tasking, may be performed at the end of the virtual session. This supplemental action, or tasking, may include, for example, processing related to input, actions and the like provided by the user while engaged in the virtual environment during the virtual session, and/or the application running during the virtual session. Productivity may be enhanced if this supplemental action or tasking may be initiated by the system in response to a detected end of the virtual session, without specific user intervention. This may allow otherwise idle time, between the end of the virtual session and a point in time at which the user provides a separate input to initiate the supplemental tasking, to be used productively. Accordingly, in a system and method, in accordance with implementations described herein, the system may detect that a user, engaged in an application in a virtual environment, has ended (or temporarily disengaged from) a virtual session based on, for example, a gesture detected by the system. The gesture may be associated with an action characteristically taken by the user at the end of a virtual session, such as, for example, removal of the HMD, and that does not require specific additional action on the part of the user. This type of gesture may be detected based on, for example, position and/or orientation data provided by sensors in HMD.

FIGS. 4A-4F illustrate an example implementation, in which the system detects a position of the HMD 100, and determines that the detected position of the HMD 100 corresponds to a removal of the HMD 100 from the head of the user, or out of the line of sight of the user. The system then correlates this detected position of the HMD 100 to an end of a virtual session. In response to the detected end of the virtual session, the system initiates follow on action, for example, processing of data related to the action(s) taken by the user while engaged in the virtual session. In this manner, processing, or other action, may be performed in the time between the user's removal of the HMD 100 and the point in time at which the user would otherwise manually initiate this processing at another computing device, such as, for example, a computer terminal that is operably coupled with the HMD 100. This may make productive use of this otherwise idle time, and enhance productivity.

Figure 4A:
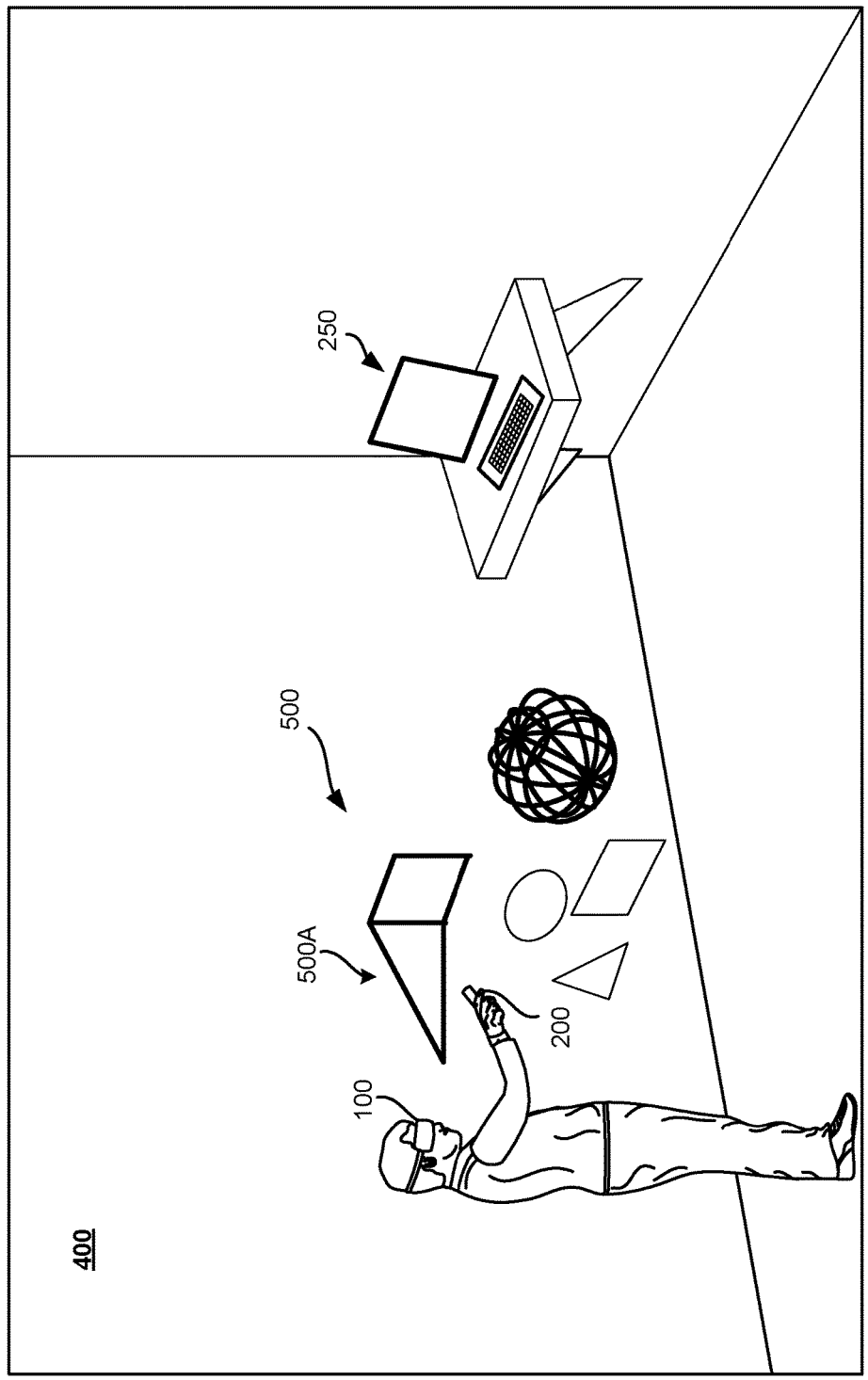

FIG. 4A is a third person view of a user in a physical space 400, engaged in a virtual environment generated and displayed by the HMD 100, for example, on the display of the HMD 100. In the example shown in FIG. 4A, the user is wearing the HMD 100, and interacting with various virtual elements associated with an application running in the virtual environment 500 using a handheld electronic device 200, with another external computing device 250 receiving data based on the user's interaction in the virtual environment. In the example shown in FIG. 4A, the various virtual elements of the example virtual environment 500 are illustrated in front of the user, as they may appear to the user, simply for ease of discussion and illustration. The example implementation shown in FIGS. 4A-4F and 5A-5C will be discussed with respect to a 3D modeling application running in the virtual environment 500, simply for ease of discussion and illustration. However, the principles to be described below may be applied to numerous other applications and virtual experiences to be executed in a virtual environment, and having additional action to be performed, following the end of a virtual session, and/or at an interim point in the virtual session at which user engagement in the virtual session has been temporarily suspended.

As shown in FIGS. 4A, 4B and 4C, the user may interact with various virtual objects, elements and the like in the virtual environment 500, for example, using the handheld electronic device 200, and/or hand/arm gestures and the like. The user interactions with the virtual objects may correspond to user inputs, or user commands, to be performed in the virtual environment to produce a desired result, as shown in the changes to the virtual 3D object 550 under construction when going from FIG. 4A to FIG. 4B to FIG. 4C.

Figure 4D:
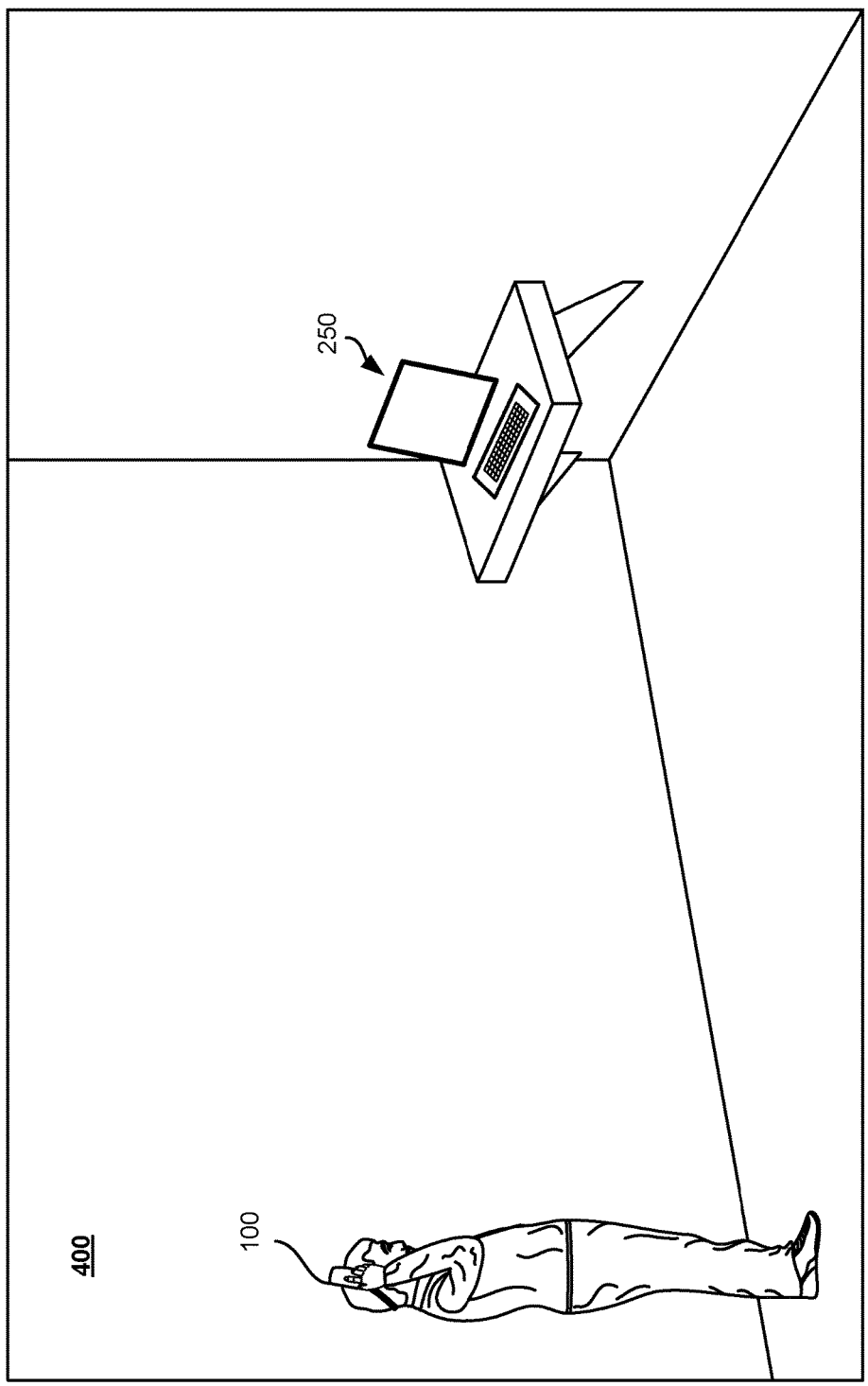

As shown in FIGS. 4D and 4E, when the user ends the virtual session, or when the user temporarily disengages from the virtual environment, the user may move the HMD 100 out of his line of sight, and/or may remove the HMD 100 from his head. This movement/removal of the HMD 100 may be considered a movement, or gesture, or action, associated with the end of a virtual session, which may be detected by the system. This movement/removal of the HMD 100 is a natural action taken by the user as the user disengages from the virtual environment to terminate the virtual session, and/or to temporarily suspend engagement in the virtual session. This movement/removal of the HMD 100 may cause the HMD 100 to be oriented such that the front face 110*a* of the HMD 100 is in a substantially horizontal position, or substantially horizontally oriented, as shown in FIG. 4E.

In some implementations, this orientation of the HMD 100 in a previously set, or pre-defined, position, with the front face 110*a* of the HMD 100 aligned along a substantially horizontal plane, may be associated with an inactive state of the HMD 100. This orientation of the HMD 100, with the front face 110*a* aligned along the substantially horizontal plane, is typically not encountered while the user is actively engaged in the virtual environment 500, with the HMD 100 positioned to align with the user's line of sight, as the HMD 100 would be aligned when in the active state. Rather, this substantially horizontal orientation of the HMD 100 while the HMD 100 is still positioned so as to be aligned with the user's line of sight, would require the user to adopt and maintain an unnatural, relatively awkward position, looking straight up. This substantially horizontal orientation of the HMD 100 may, in most circumstances, be associated with removal of the HMD 100 from the line of sight of the user, and/or removal from the head of the user, particularly when the substantially horizontal orientation of the HMD 100 is sustained, or maintained, for greater than a previously set, or pre-defined amount of time, and may thus be associated with an inactive state of the HMD 100. Thus, although the removal of the HMD 100 and resulting substantially horizontal orientation of the HMD 100 is a relatively normal, unconscious action on the part of the user at the end of the virtual session, detection of this substantially horizontal orientation of the HMD 100 may be considered to be a relatively reliable indication of an end of the virtual session.

In some implementations, the removal of the HMD 100 from the line of sight of the user and/or removal from the head of the user, associated with the inactive state of the HMD 100, may be detected by other sensors in the HMD 100. For example, in some implementations, the optical tracking device 165 may sense a loss in detection and/or tracking of the user's eyes, and associate that loss in detection and/or tracking with a move of the HMD 100 out of the line of sight of the user and/or a removal from the user's head, and a transition of the HMD 100 from the active state to the inactive state. In some implementations, a light sensor may detect a change in light associated with removal of the HMD 100 from the user's head, and a transition of the HMD 100 from the active state to the inactive state.

Figure 4F:
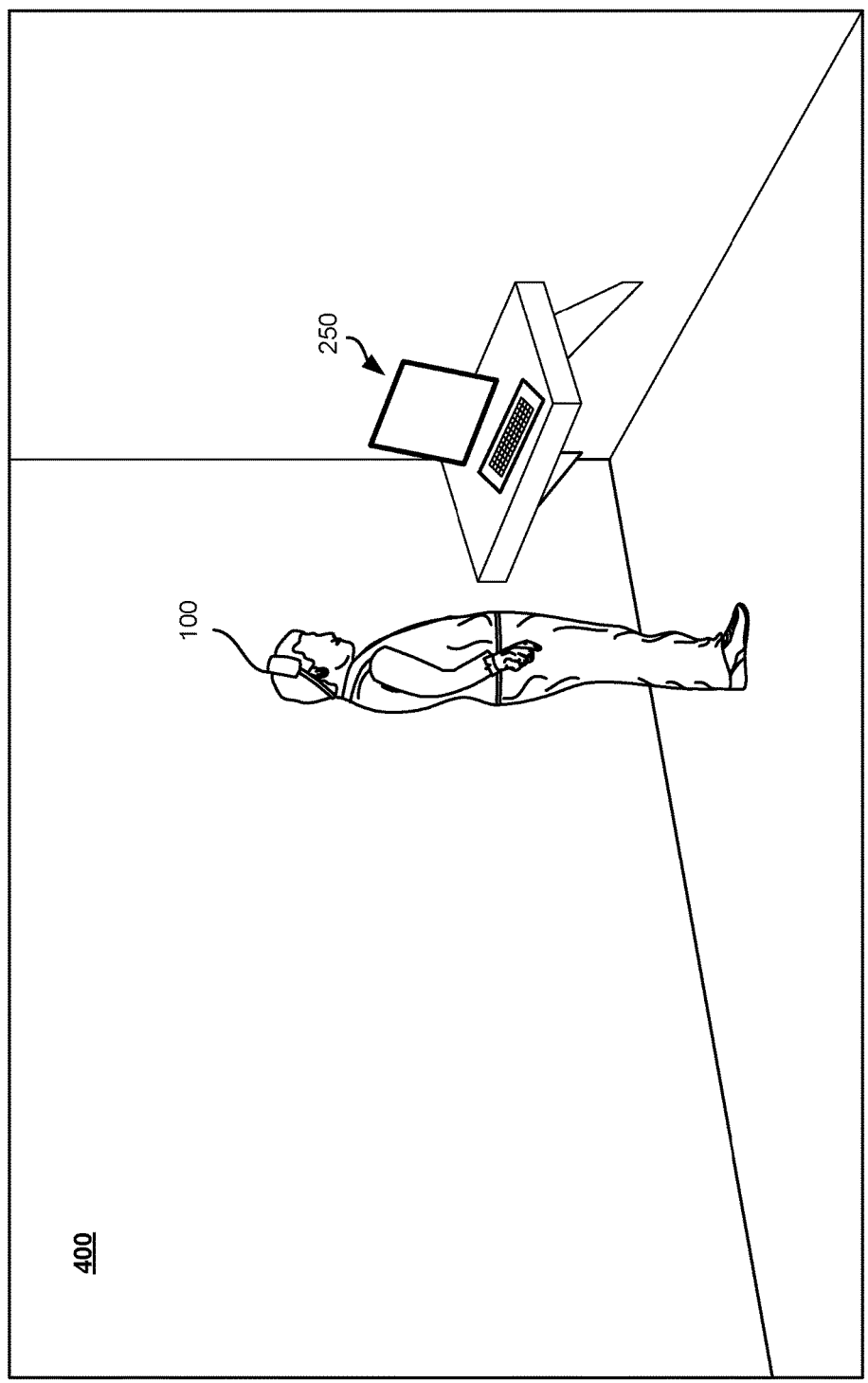

Typically, at the end of a virtual session, the user would move to the external computing device 250 to perform processing or additional tasking related to the actions taken during the virtual session, as shown in FIG. 4F. However, in a system and method, in accordance with implementations described herein, processing or additional tasking related to the actions taken during the virtual session may be automatically initiated by the system in response to detection of the removal of the HMD 100. This may make productive use of the otherwise idle time between removal of the HMD 100 (as illustrated in FIG. 4D) and arrival of the user at the external computing device 250 for manual input of user commands to initiate processing (as illustrated in FIG. 4F).

In some implementations, the orientation state of the HMD 100 may be detected and/or tracked by, for example, sensors in the HMD 100. For example, sensors in the IMU 162 of the HMD 100, for example, a gyroscope included in the IMU 162 of the HMD 100, may detect that the HMD 100 is oriented in a substantially horizontal state, as described above with respect to FIG. 4E. As noted above, this substantially horizontal state of the HMD 100 is not typically encountered when the HMD 100 is worn by a user who is actively engaged in the virtual environment. However, to avoid mis-identification of the end of a virtual session based on the orientation of the HMD 100, in some implementations, an indication of the end of a virtual session may be detected when it is determined that the HMD 100 remains oriented in the substantially horizontal state for greater than a set threshold amount of time. For example, in some implementations, it may be determined that the user has terminated, or temporarily suspended, the virtual session when it is detected that the HMD 100 remains in a substantially horizontal orientation for greater than or equal to approximately 1 second. This 1 second set threshold time is just one example, and the set threshold time may vary based on numerous different factors, such as, for example, features of a particular application, and/or a likelihood that the user's interaction in that particular application may cause the HMD 100 to be oriented in that substantially horizontal position for a particular amount of time.

Upon detection of the HMD 100 oriented in the substantially horizontal state, and a determination that the virtual session has been terminated, or suspended based on the substantially horizontal orientation of the HMD 100, as described above, the system may initiate further action, or supplemental tasking, related to information associated with the virtual session that has just ended. For example, the system may begin processing information and/or data related to the virtual 3D object 550 under construction as described above with respect to FIGS. 4A-4D. This processing may be performed by the HMD 100, and/or by one or more external computing devices such as, for example, the external computing device 250 shown in FIGS. 4A-4D. Because the end of the virtual session has been detected based on the user removal of the HMD 100 as described above, this processing, or supplemental tasking, may be automatically initiated by the system in response to the detection of the end of the virtual session, for example, at the point illustrated in FIG. 4D, rather than waiting for a specific user command to initiate the processing, or supplemental tasking, after the user arrives at the external computing device, as shown in FIG. 4F. The use of this idle time, between the point illustrated in FIG. 4D and the point illustrated in FIG. 4F, may enhance user convenience and productivity.

Figure 5A:
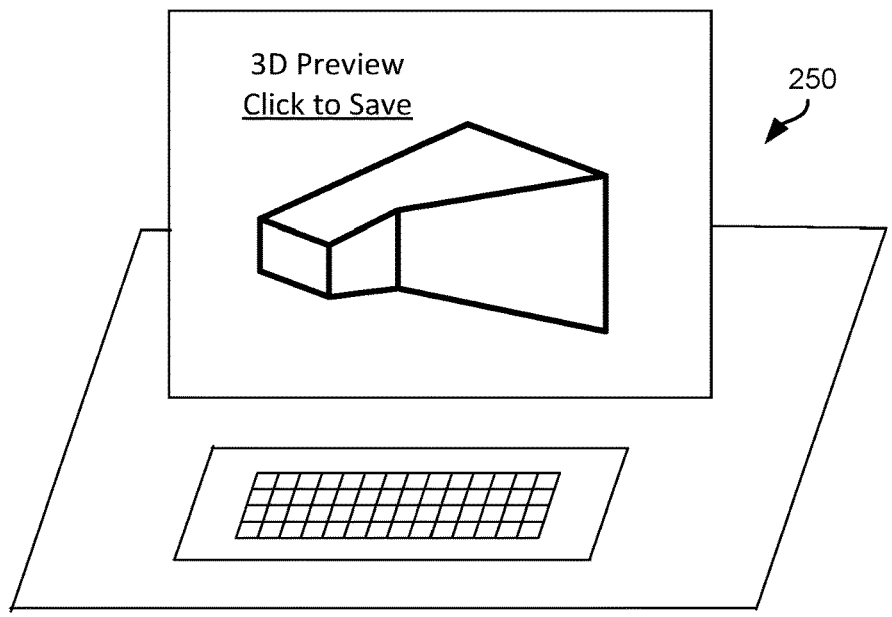
FIGS. 5A-5C illustrate exemplary processing initiated in response to detection of an end of a virtual session, in accordance with implementations as described herein.
Figure 5B:
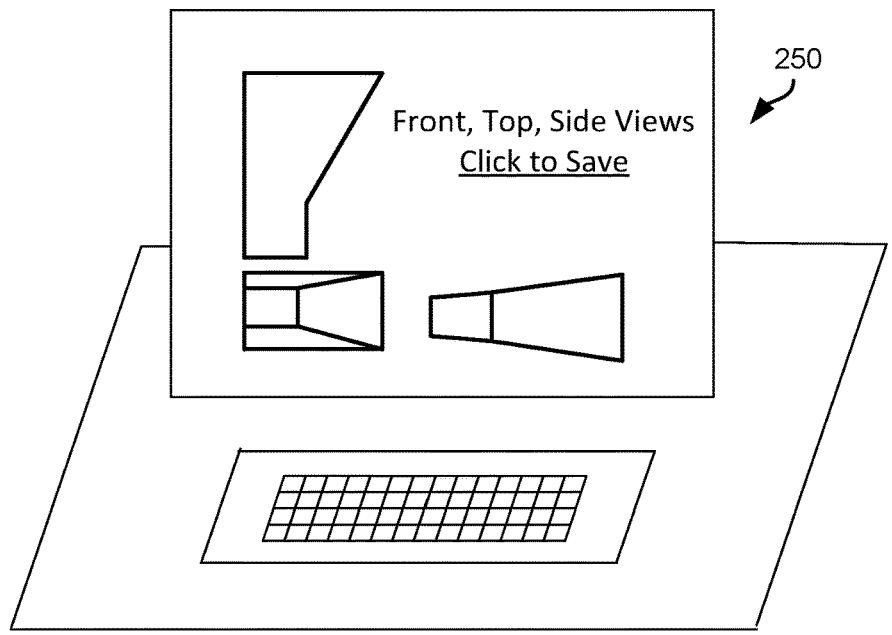
Figure 5C:
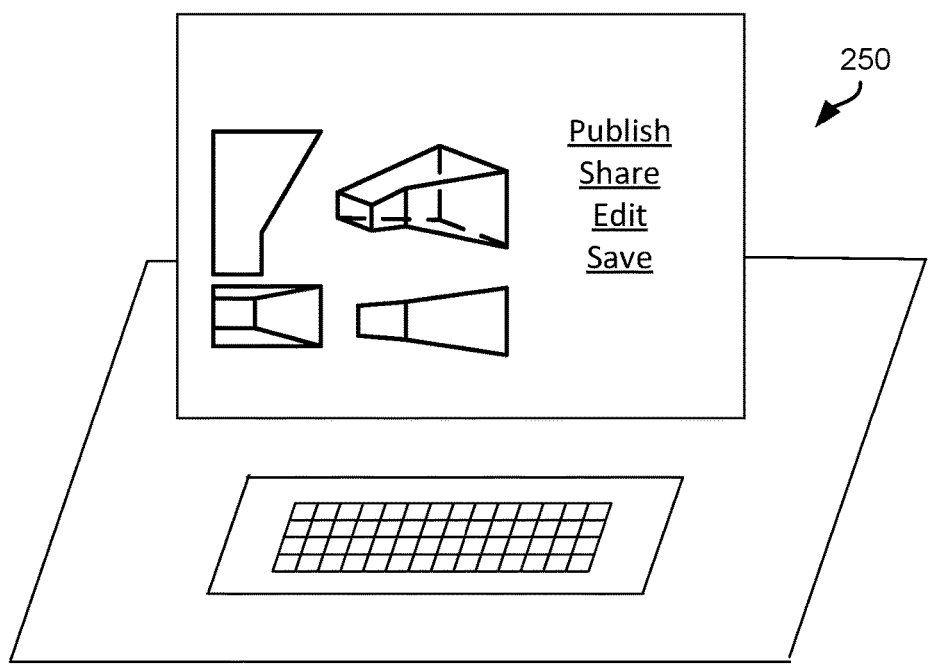

As noted above, in response to detection of the end of the virtual session as described above, the system may automatically initiate processing, by the HMD 100 and/or an external computing device such as the external computing device 250 shown in FIGS. 4A-4F. This initiation of processing when the end of the virtual session is detected (at the point illustrated in FIG. 4D) rather than when the user arrives at the computing device 250 to manually input commands to initiate processing (at the point illustrated in FIG. 4F) may allow for productive use of available time. This may be especially beneficial when processing computationally intensive tasks such as, for example, processing involving graphics and the like. For example, upon detection of the end of the virtual session as described above, the system may initiate processing to generate a 3D preview of the object 550, for viewing by the user, as shown in FIG. 5A, and/or a plurality of different views of the object 550, as shown in FIG. 5B, and/or options for publishing or sharing the object 550, and/or for further editing the object 550, as shown in FIG. 5C. These are just some examples of the types of processing that may be initiated and performed by the system in response to the detection of the end of the virtual session based on the substantially horizontal orientation of the HMD 100 as described above.

In some implementations, a sustained idle state of the HMD 100, may be detected by, sensors such as, for example, sensors included in the IMU 162 of the HMD 100, to indicate the end of a virtual session (in addition to, or instead of, the detection of the horizontal orientation of the HMD 100 to indicate the end of the virtual session as described above). These sensors may detect even relatively slight movement when the HMD 100 is worn by the user. That is, even when it is the user's intention to remain substantially still, the user does not remain completely still, or stationary, and the sensors of the HMD 100 worn by the user will detect slight natural movement of the user (and thus the HMD 100 worn by the user). This detected movement may indicate that the user maintains at least some level of engagement in the virtual environment.

Figure 6A:
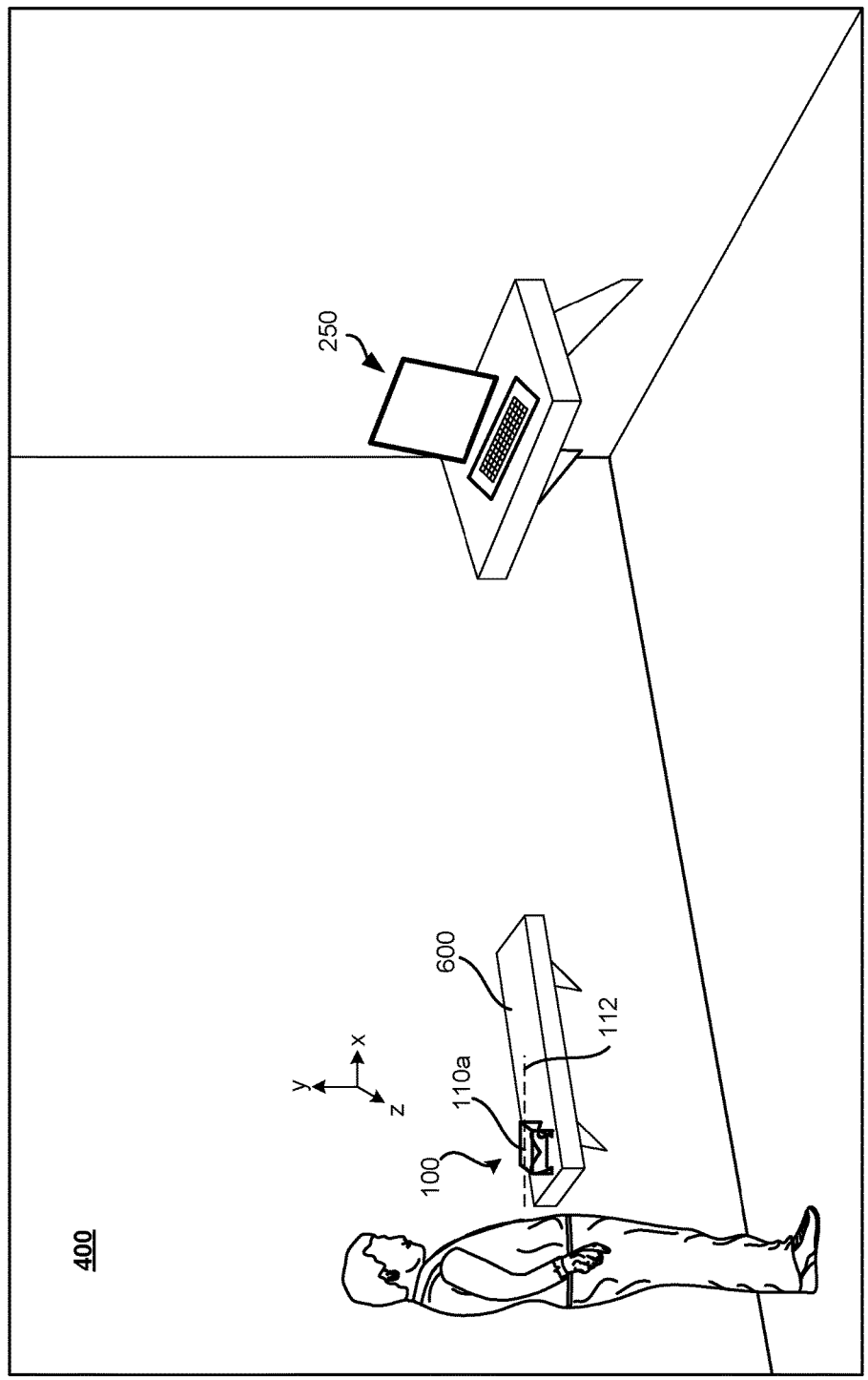
Figure 6B:
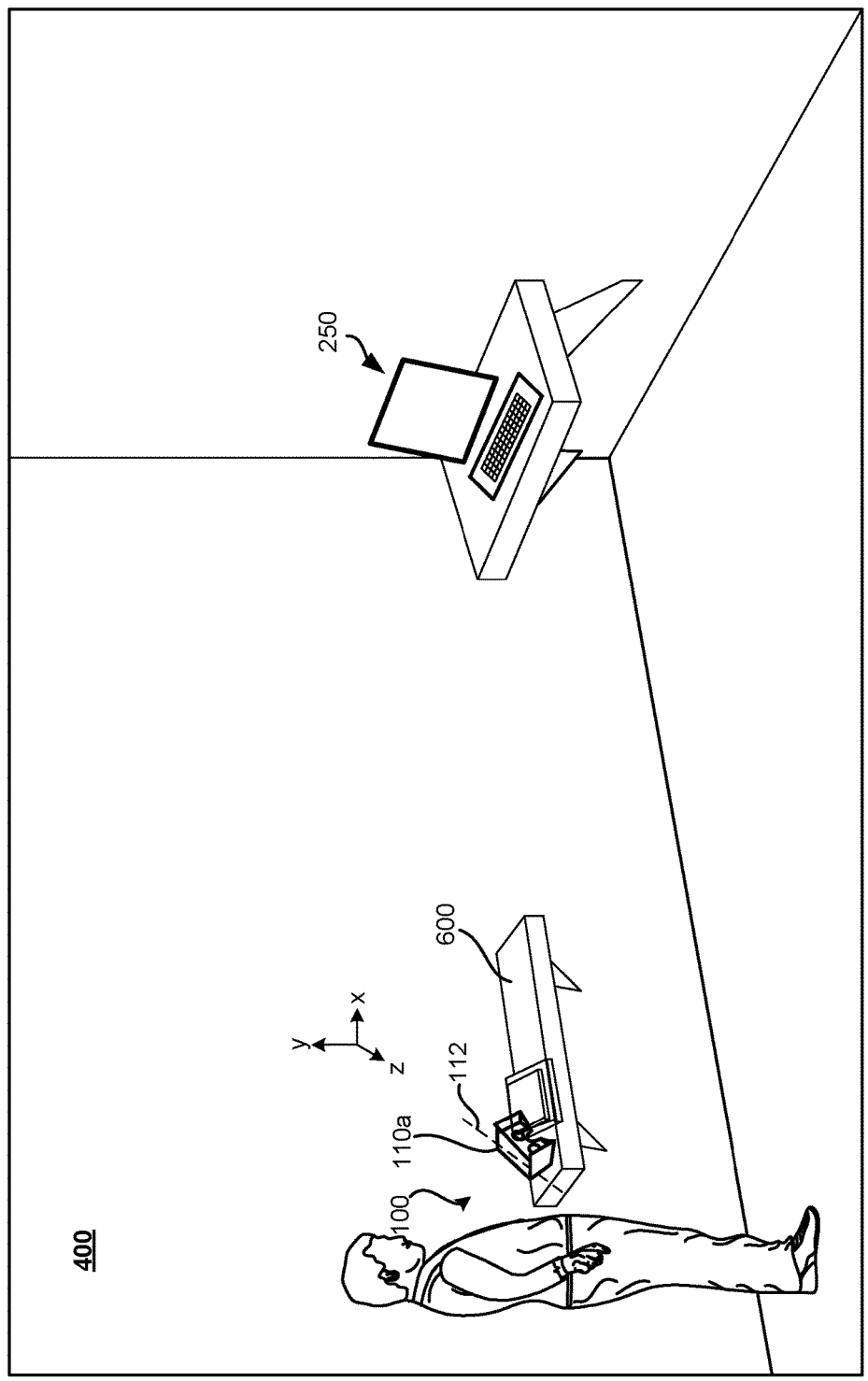

In some implementations, the set gesture indicating termination, or temporary suspension, of a virtual session may be defined based on detection of the HMD 100 remaining in the same position, essentially completely still, for greater than or equal to a previously set, or pre-defined, amount of time. FIGS. 6A-6C illustrate the HMD 100, removed from the head of the user, in various different positions on a stationary support surface 600. In the example shown in FIG. 6A, the user has removed the HMD 100 and positioned the HMD 100 on the stationary support surface 600 with the HMD 100 oriented substantially horizontally, and for example, with an exemplary centerline 112 of the HMD 100 oriented substantially horizontally. In the example shown in FIG. 6B, the user has removed the HMD 100 and positioned the HMD 100 on the stationary support surface 600 with the HMD 100 oriented at an angle, or an incline, with respect to the horizontal, and for example, with an exemplary centerline 112 of the HMD 100 oriented at an angle, or at an incline, with respect to the horizontal. In the example shown in FIG. 6C, the user has removed the HMD 100 and positioned the HMD 100 on the stationary support surface 600 with the HMD 100 oriented substantially vertically, and, for example, with an exemplary centerline 112 of the HMD 100 oriented substantially vertically. The exemplary centerline 112 of the HMD 100 is included in FIGS. 6A-6C simply for ease of illustration and explanation of the various different positions in which the HMD 100 may be placed on the stationary support surface 600.

In each of the different example positions illustrated in FIGS. 6A-6C, the HMD 100 positioned on the stationary support surface 600 may remain substantially completely still, and without any movement detected by the sensors, for example, the sensors of the IMU 162 of the HMD 100, regardless of the orientation of the HMD 100. Based on data provided by the sensors of the HMD 100, the system may determine that the HMD 100 has remained stationary, and has not moved, for greater than or equal to a previously set, or pre-defined, amount of time. Based on this determination that the HMD 100 has remained stationary for at least the set amount of time, the system may determine that the set gesture has been detected, indicating that the user has disengaged from the virtual environment. In response to this detection of the end of the virtual session, or temporary suspension of the virtual session, the system may automatically initiate processing, for example processing associated with actions implemented during the virtual session, without separate user intervention to initiate the processing, as described above. This may allow any follow on processing, supplemental tasking and the like to be initiated without manual input of a command by the user, or other specific user intervention. This automatic initiation of follow on processing may enhance user convenience and productivity, making use of otherwise idle time between the user removal of the HMD 100 and a user entry of a specific command to initiate processing.

In some implementations, the system may detect the set gesture indicating an end of the virtual session, and/or a suspension of the user's engagement in the virtual session, based on factors that do not necessarily involve movement of the HMD 100 out of the line of sight of the user and/or removal of the HMD 100 from the head of the user. For example, in some implementations, the system may detect an end of the virtual session, and/or a suspension of the user's engagement in the virtual session, based on the position of the user wearing the HMD 100 in the physical space 400, for example, the position of the user wearing the HMD 100 in the physical space 400 relative to other elements of the physical space 400 such as, for example, the external computing device 250. In some implementations, the system may detect an end of the virtual session, and/or a suspension of the user's engagement in the virtual session, based on the user's movement through the physical space 400, for example, the user's movement toward certain elements of the physical space 400 such as, for example, the external computing device 250. In some implementations, the system may detect an end of the virtual session, and/or a suspension of the user's engagement in the virtual session, based on the user's rate, or speed, or velocity of movement through the physical space 400, for example, the user's rate, or speed, or velocity, of movement toward certain elements of the physical space 400 such as, for example, the external computing device 250. The system may make this determination based on, for example, a comparison of a detected velocity and/or acceleration of the user in the physical space compared to a previously set, or previously defined, velocity and/or acceleration value.

Figure 7A:
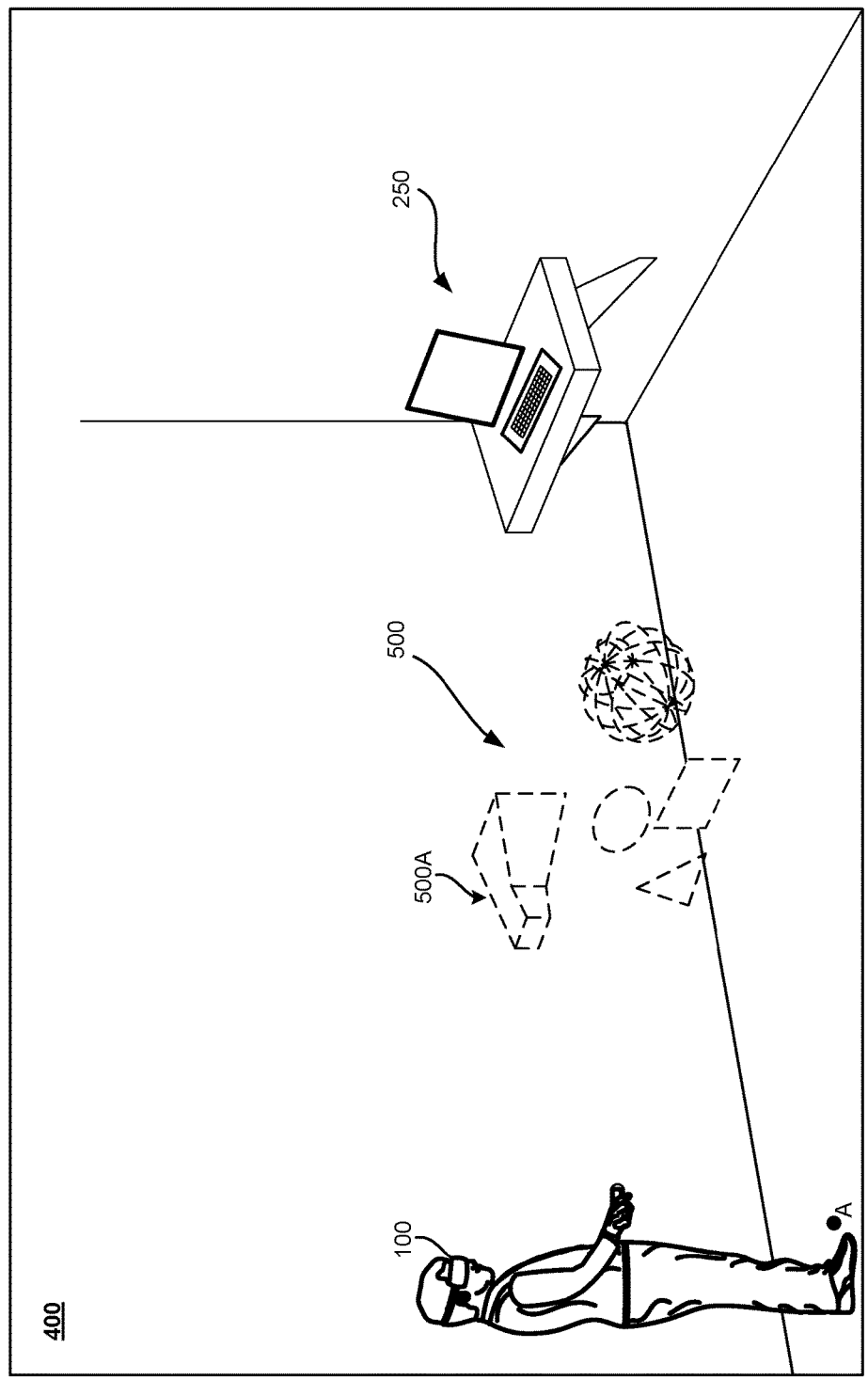
Figure 7C:
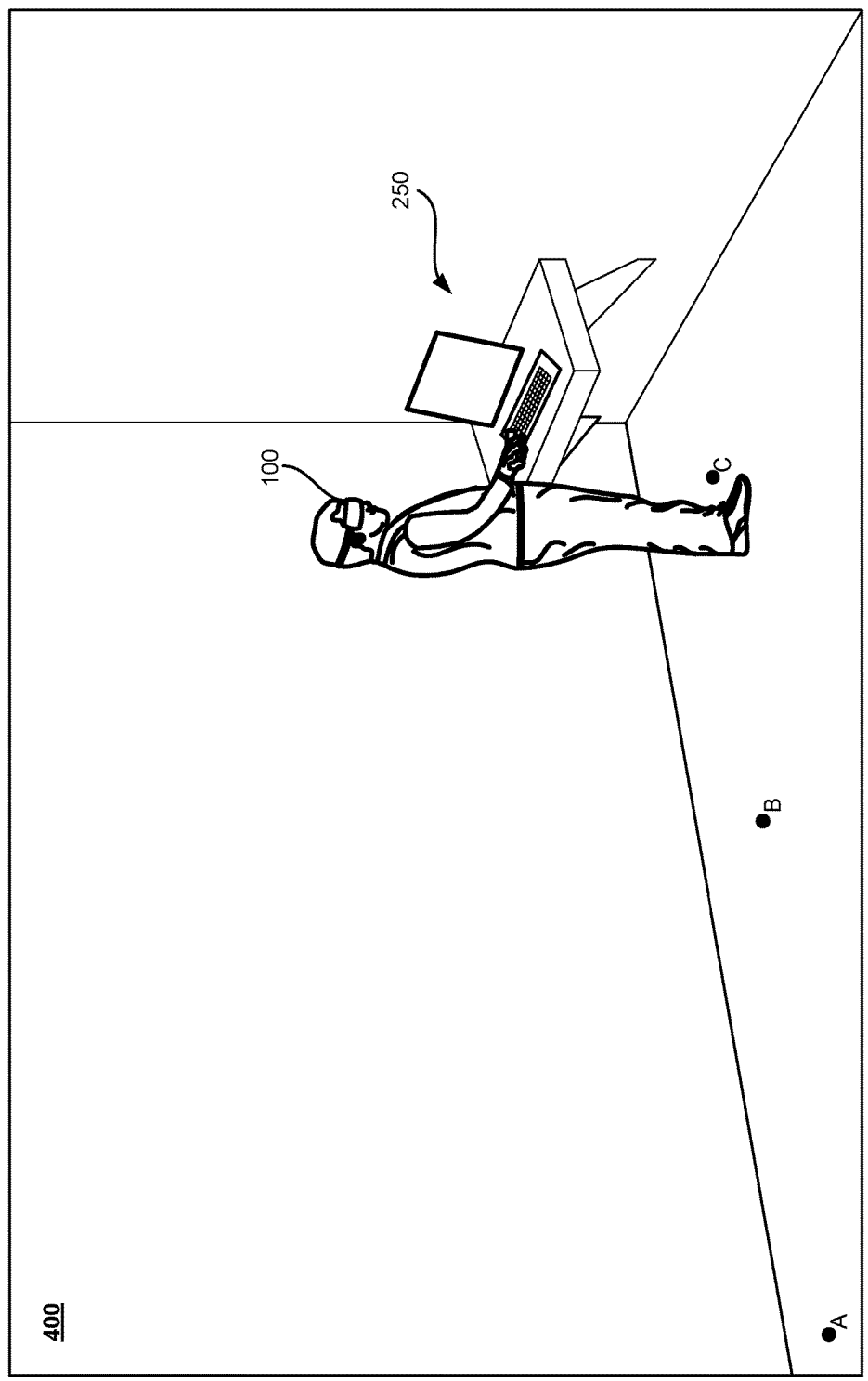

The user, wearing the HMD 100 and engaged in the virtual environment 500 while positioned at a position A in the physical space 400, as shown in FIG. 7A, may move in the physical space 400 to the position B in the physical space 400, as shown in FIG. 7B, and/or may move to the position C in the physical space 400, as shown in FIG. 7C. The system may detect and track the position and/or orientation of the user wearing the HMD 100 in the physical space 400 as the user wearing the HMD 100 moves in the physical space 400. The system may be set to detect the set gesture in response to detection of the user wearing the HMD 100 at set position (s) within the physical space 400, and/or moving in set direction(s) or approaching set element(s) in the physical space 400, and/or moving in the set direction(s) or approaching the set element(s) at greater than or equal to a previously set rate or speed or velocity. In response to one or more of these set gestures, the system may determine that the user has terminated, or temporarily suspended engagement in the virtual session, and may initiate processing, or supplemental tasking, as described above, even though the user has not necessarily removed the HMD 100.

For example, the system may detect that the user wearing the HMD 100 is at, or has moved to, the position C shown in FIG. 7C, and may determine that, based on the user's physical proximity to the external computing device 250 it is the user's intention to terminate, or temporarily suspend, the virtual session, and may automatically initiate processing and/or other supplemental tasking, for example, processing and/or tasking related to the recently terminated or suspended virtual session, as soon as the system detects the user within the set proximity of the external computing device 250. The ability to initiate this processing without specific manual user inputs, for example, at the external computing device 150, may enhance productivity and effectiveness, and may improve the user's experience.

In some implementations, the system may detect the user's movement, for example, along a set path or direction, indicating the user is moving for example toward a certain element in the physical space 400, such as, for example, toward the external computing device 250. The system may determine that, based on the user's detected movement direction in the physical space 400, the user is moving toward, for example, the external computing device 250. For example, the system may detect that the user has moved from the position A shown in FIG. 7A to, or towards, the position B shown in FIG. 7B, along a path toward the position C, within a previously set proximity to the external computing device 250 shown in FIG. 7C. The system may determine that this detected user movement direction indicates the user has disengaged from the virtual environment, and intends to terminate, or temporarily suspend, the virtual session. Based on this detected movement direction, for example, at the user position B in the physical space 400 (or another position in the physical space 400, based on system settings), the system may detect a termination, or temporary suspension of the virtual session, and may automatically initiate processing and/or other supplemental tasking, for example, processing and/or tasking related to the recently terminated or suspended virtual session.

In some implementations, the system may detect the user's movement, for example, from the position A shown in FIG. 7A toward the position B shown in FIG. 7B and/or toward the position C shown in FIG. 7C. The system may also detect a rate at which the user moves, for example, from the position A to the position B, based on, for example, an amount of time elapsed from detection at the position A to detection at the position B; or from the position A to the position C, based on, for example, an amount of time elapsed from detection at the position A to detection at the position C. The system may determine that, based on the user's detected movement direction in the physical space 400, together with the rate at which the user is moving, that the user has disengaged from the virtual environment, and intends to terminate, or temporarily suspend, the virtual session. Based on this detected movement rate, for example, together with the detected movement rate, or speed, for example, greater than or equal to a set threshold, the system may detect a termination, or temporary suspension of the virtual session, and may automatically initiate processing and/or other supplemental tasking, for example, processing and/or tasking related to the recently terminated or suspended virtual session.

In a system and method, in accordance with implementations as described herein, initiation of supplemental tasking, such as initiating processing, may be triggered in response to the detection of the end of the virtual session, and/or a temporary suspension of the virtual session. The set gesture may be detected in response to the detection of the HMD 100 in a set orientation, as described above with respect to FIGS. 4A-4F. The set gesture may be detected in response to detection of the HMD 100 in a stationary position for greater than or equal to a set amount of time, as described above with respect to FIGS. 6A-6C. The set gesture may be detected in response to detected user movement in a set direction and/or at greater than a set velocity, and/or within a set proximity of an external object, as described above with respect to FIGS. 7A-7C. In some implementations, the set gesture may be detected when an optical tracking device within the HMD 100 detects a loss of tracking of the eyes of the user, associated with movement of the HMD 100 out of the line of sight and/or removal of the HMD 100 from the head of the user. In some implementations, the set gesture may be detected in response to detection of the HMD 100 at an elevation which would indicate removal of the HMD 100, such as, for example, at or below a waist level, or a vertical distance over the user's head, corresponding to an elevation at which the HMD 100 would not naturally be positioned for a sustained amount of time in the active state. In some implementations, the set gesture may be detected in response to detection of movement of the HMD 100 along a path characteristic of the movement of the HMD 100 out of the line of sight of the user and/or removal of the HMD 100 from the head of the user, including, for example, a lifting motion in conjunction with a certain amount of rotation. These are just some examples of set gestures which may be detected by the system to indicate an end of a virtual session and/or a temporary suspension of the virtual session, which may in turn automatically trigger the initiation of follow on processing tasks, in particular, tasks associated with actions taken by the user during the virtual session.

Figure 8:
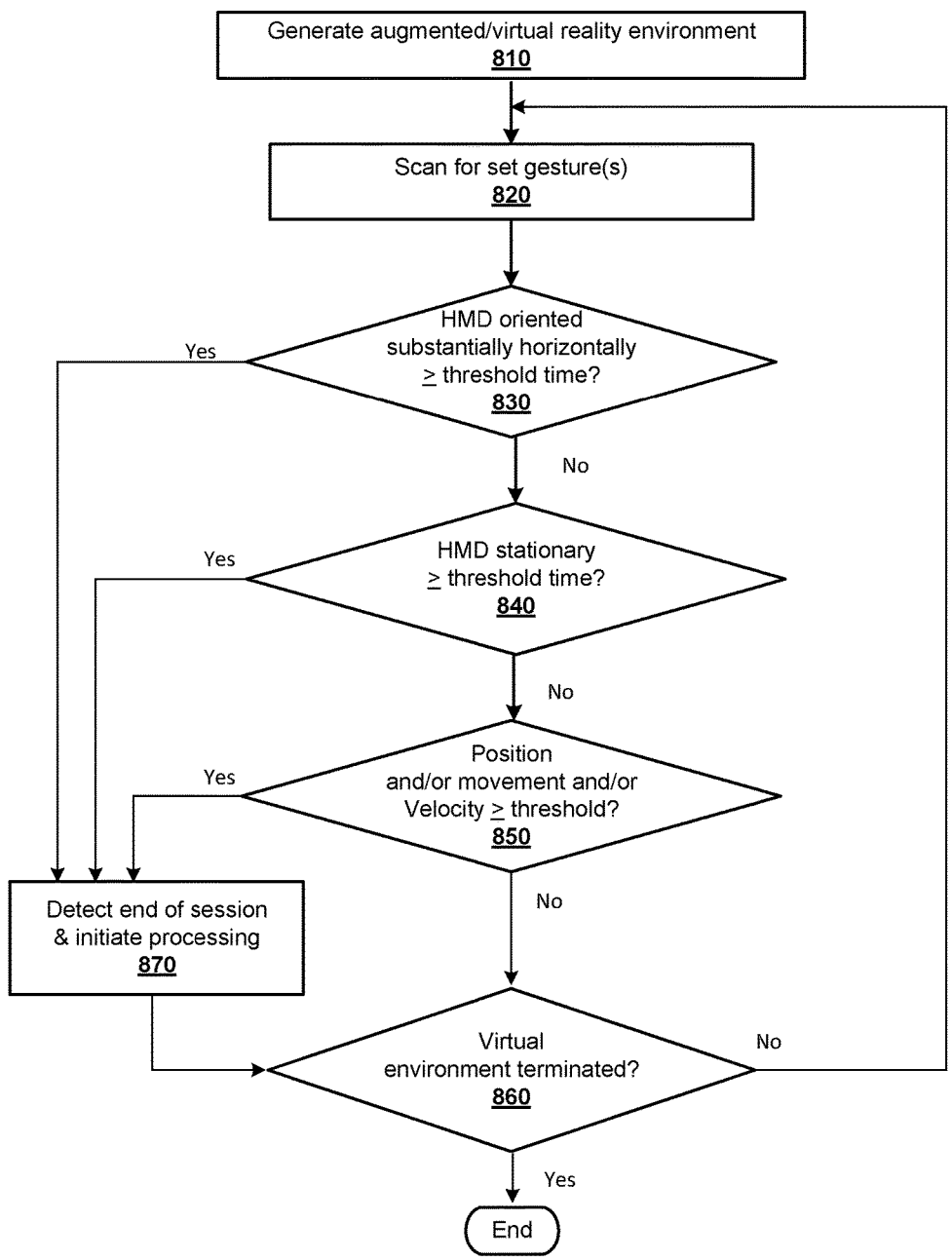
FIG. 8 is a flowchart of a method, in accordance with implementations as described herein.

A method 800 of detecting an end of a virtual session in an augmented and/or virtual reality environment, in accordance with implementations as described herein, is shown in FIG. 8.

A user may initiate an augmented reality experience and/or a virtual reality experience using, for example, a computing device such as, for example, a system including a HMD device as described above, which may be operably coupled with, or paired with, one or more external devices, to generate the augmented reality and/or virtual reality environment (block 810). The system may detect and track the elements of the system, such as, for example, the HMD as described above, detect gestures which may correspond to a user's disengagement from the virtual environment, and a termination of the virtual session, and/or a temporary suspension of the virtual session (block 820). The detected gesture indicating termination and/or temporary suspension of the virtual session may include a detection of a substantially horizontal orientation of the HMD for greater than or equal to a set threshold amount of time (block 830), as described in detail above with respect to FIGS. 4A-4F. The detected gesture indicating termination and/or temporary suspension of the virtual session may include a detection that the HMD has remained stationary, without any detected movement, for greater than or equal to a threshold amount of time (block 840), as described above with respect to FIGS. 6A-6C. The detected gesture indicating termination and/or temporary suspension of the virtual session may include detection of the user wearing the HMD at a particular location, and/or a detection of movement of the user wearing the HMD in a particular direction and/or at a velocity that is greater than or equal to a set threshold velocity (block 850), as described above with respect to FIGS. 7A-7C. In response to one or more of the set gestures (blocks 830, 840, 850), the system may detect a termination, or temporary suspension of the virtual session, and may initiate processing related to the virtual session (block 870), as described above with respect to FIGS. 5A-5C. The process may continue until it is determined that the current augmented reality and/or virtual reality experience has been terminated (block 860).

In a system and method, in accordance with implementations described herein, an end of a virtual session, or a temporary suspension of a virtual session, may be detected based on a set gesture that does not involve specific user input or intervention. Follow on processing, and/or supplemental tasking, based on user interactions during the virtual session, may be automatically initiated by the system in response to the detected end of the virtual session, without separate user intervention or manual input to initiate processing, making productive use of available time and computing resources.

Figure 9:
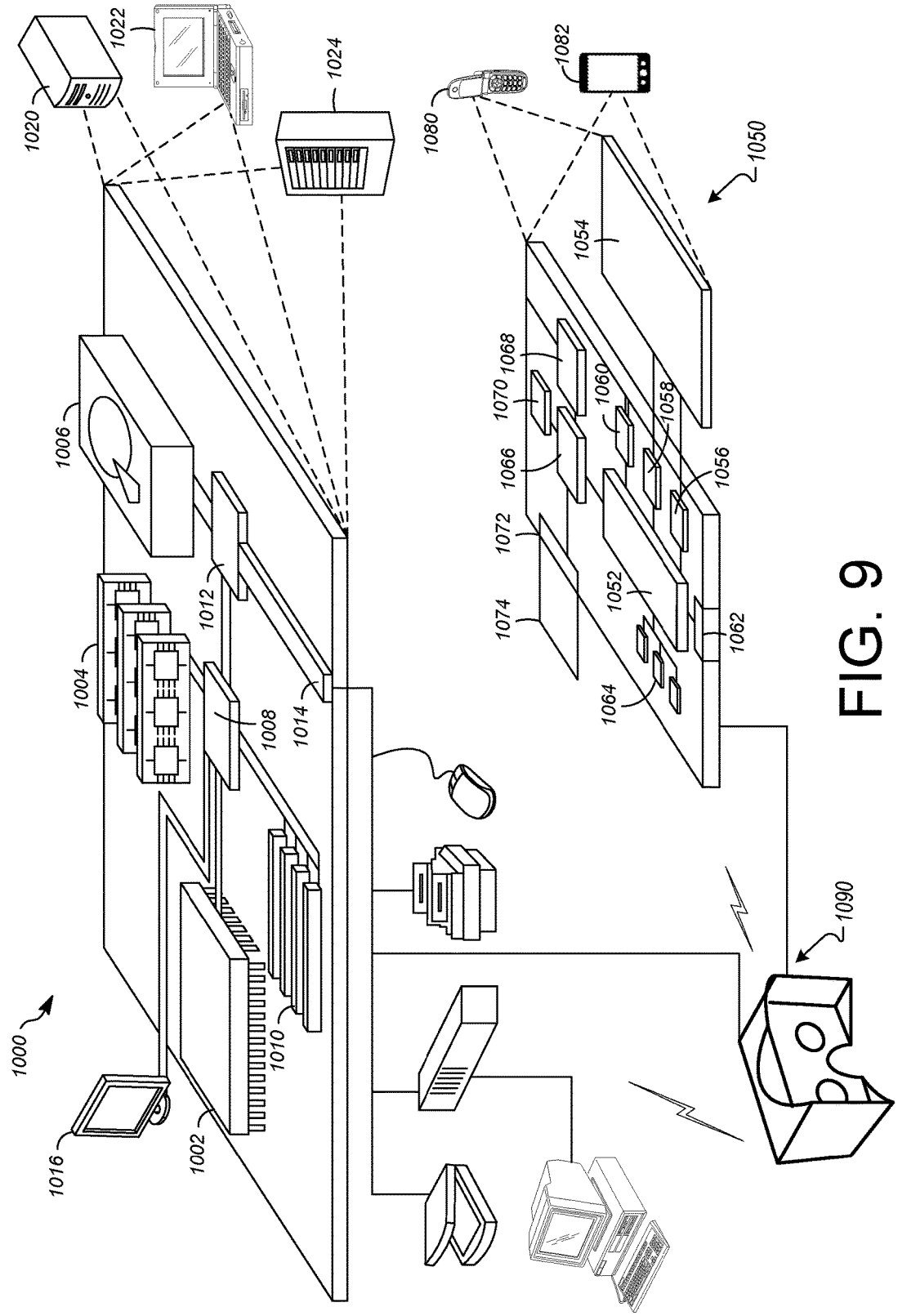
FIG. 9 shows an example of a computer device and a mobile computer device that can be used to implement the techniques described herein.

FIG. 9 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
    generating a virtual environment in a head mounted display (HMD) device operating in an ambient environment;
    initiating a virtual session and receiving at least one user input for executing at least one corresponding command in the virtual environment while the virtual session is in an active state;
    detecting at least one of a position or an orientation of the HMD in the ambient environment;
    detecting a gesture input based on the at least one of the position or the orientation of the HMD;
    detecting an end of the virtual session based on the detection of the gesture input; and
    initiating, in response to the detected end of the virtual session, processing related to the at least one user input received during the virtual session while in the active state.

2. The method of claim 1, detecting a gesture input based on the at least one of the position or the orientation of the HMD in the ambient environment including:
    detecting an orientation of the HMD;
    comparing the detected orientation of the HMD to a set orientation; and
    detecting the gesture input corresponding to the detection of the end of the virtual session when, based on the comparison it is determined that the detected orientation of the HMD matches the preset orientation of the HMD for greater than or equal to a set amount of time.

3. The method of claim 2, wherein the set orientation of the HMD corresponds to a horizontal alignment of a centerline of the HMD worn by the user.

4. The method of claim 1, detecting a gesture input based on the at least one of the position or the orientation of the HMD in the ambient environment including:
    detecting the position and the orientation of the HMD; and
    detecting the gesture input corresponding to the detection of the end of the virtual session when it is determined, based on the position and orientation of the HMD, that the HMD remains stationary for greater than or equal to a set amount of time.

5. The method of claim 1, detecting a gesture input based on the at least one of the position or the orientation of the HMD in the ambient environment including:
    detecting the position of the HMD; and
    detecting the gesture input corresponding to the detection of the end of the virtual session when, based on the position of the HMD, it is determined that the HMD is positioned at less than or equal to a preset distance of a computing device in the ambient environment, the computing device being operably coupled to the HMD, and external to the HMD.

6. The method of claim 1, detecting a gesture input based on the at least one of the position or the orientation of the HMD in the ambient environment including:
   detecting the position of the HMD;
   detecting a movement path of the HMD based on the position of the HMD; and
   detecting the gesture input corresponding to the detection of the end of the virtual session when, based on the movement path of the HMD, it is determined that the movement path of the HMD is aligned with a computing device in the ambient environment, the computing device being operably coupled to the HMD, and external to the HMD.

7. The method of claim 6, detecting a movement path of the HMD based on the position of the HMD including:
   detecting a movement direction of the HMD;
   detecting a movement velocity of the HMD; and
   detecting the gesture input corresponding to the end of the virtual session when the movement velocity of the HMD in the detected movement direction is greater than or equal to a set velocity.

8. The method of claim 1, initiating processing related to the at least one user input received during the virtual session including:
   automatically initiating processing at a computing device in the ambient environment, operably coupled to the HMD, and external to the HMD without user input.

9. A system, comprising:
   a computing device configured to generate a virtual reality environment, the computing device including:
      a memory storing executable instructions; and
      a processor configured to execute the instructions to cause the computing device to:
         generate a virtual environment in a head mounted display (HMD) device operating in an ambient environment;
         initiate a virtual session and receiving at least one user input for executing at least one corresponding command in the virtual environment while the virtual session is in an active state;
         detect at least one of a position or an orientation of the HMD in the ambient environment;
         detect a gesture input based on the at least one of the position or the orientation of the HMD;
         detect an end of the virtual session based on the detection of the gesture input; and
         initiate processing related to the at least one user input received during the virtual session while in the active state in response to the detected end of the virtual session.

10. The system of claim 9, wherein, in detecting a gesture input based on the at least one of the position or the orientation of the HMD in the ambient environment, the instructions cause the computing device to:
   detect an orientation of the HMD;
   compare the detected orientation of the HMD to a set orientation; and
   detect the gesture input corresponding to the detection of the end of the virtual session when, based on the comparison it is determined that the detected orientation of the HMD matches the set orientation of the HMD for greater than or equal to a set amount of time.

11. The system of claim 10, wherein the set orientation of the HMD corresponds to a horizontal alignment of a centerline of the HMD worn by the user.

12. The system of claim 9, wherein, in detecting a gesture input based on the at least one of the position or the orientation of the HMD in the ambient environment, the instructions cause the computing device to:
   detect the position and the orientation of the HMD; and
   detect the gesture input corresponding to the detection of the end of the virtual session when it is determined, based on the position and orientation of the HMD, that the HMD remains stationary for greater than or equal to a set amount of time.

13. The system of claim 9, wherein, in detecting a gesture input based on the at least one of the position or the orientation of the HMD in the ambient environment, the instructions cause the computing device to:
   detect the position of the HMD; and
   detect the gesture input corresponding to the detection of the end of the virtual session when, based on the position of the HMD, it is determined that the HMD is positioned at less than or equal to a set distance of a computing device in the ambient environment, the computing device being operably coupled to the HMD, and external to the HMD.

14. The system of claim 9, wherein, in detecting a gesture input based on the at least one of the position or the orientation of the HMD in the ambient environment, the instructions cause the computing device to:
   detect the position of the HMD;
   detect a movement path of the HMD based on the position of the HMD; and
   detect the gesture input corresponding to the detection of the end of the virtual session when, based on the detected movement path of the HMD, it is determined that the detected movement path of the HMD is aligned with a computing device in the ambient environment, the computing device being operably coupled to the HMD, and external to the HMD.

15. The method of claim 14, wherein, in detecting a movement path of the HMD based on the position of the HMD, the instructions cause the computing device to:
   detect a movement direction of the HMD;
   detect a movement velocity of the HMD; and
   detect the gesture input corresponding to the end of the virtual session when the movement velocity of the HMD in the detected movement direction is greater than or equal to a set velocity.

16. The system of claim 9, wherein, in initiating processing related to the at least one user input received during the virtual session, the instructions cause the computing device to:
   automatically initiate processing at a computing device in the ambient environment, operably coupled to the HMD, and external to the HMD without user input.

17. A computer program product embodied on a non-transitory computer readable medium, the computer readable medium having stored thereon a sequence of instructions which, when executed by a processor causes the processor to execute a method, the method comprising:
   generating a virtual environment in a head mounted display (HMD) device operating in an ambient environment;
   initiating a virtual session and receiving at least one user input for executing at least one corresponding command in the virtual environment while the virtual session is in an active state;
   detecting a position and an orientation of the HMD in the ambient environment;
   detecting a gesture input based on the at least one of the position or the orientation of the HMD;

detecting an end of the virtual session based on the detection of the gesture input; and automatically initiating, in response to the detected end of the virtual session, processing related to the at least one user input received during the virtual session while in the active state, at a computing device in the ambient environment, the computing device being operably coupled to the HMD and external to the HMD.

18. The computer program product of claim 17, detecting a gesture input based on the at least one of the position or the orientation of the HMD in the ambient environment including:

detecting an orientation of the HMD;

comparing the detected orientation of the HMD to a set orientation; and detecting the gesture input corresponding to the detection of the end of the virtual session when, based on the detected orientation of the HMD, it is determined that the HMD is oriented substantially horizontally for greater than or equal to a set amount of time.

19. The computer program product of claim 17, detecting a gesture input based on the at least one of the position or the orientation of the HMD in the ambient environment including:

detecting the position and the orientation of the HMD; and detecting the gesture input corresponding to the detection of the end of the virtual session when it is determined, based on the position and orientation of the HMD, that the HMD remains stationary for greater than or equal to a set amount of time.

20. The computer program product of claim 17, detecting a gesture input based on the at least one of the position or the orientation of the HMD in the ambient environment including:

detecting the position of the HMD; and detecting the gesture input corresponding to the detection of the end of the virtual session when, based on the detected and tracked position of the HMD, it is determined that the HMD is positioned at less than or equal to a set distance of the computing device.

* * * * *